United States Patent
Sakthivel et al.

(10) Patent No.: US 11,983,572 B2
(45) Date of Patent: May 14, 2024

(54) ACCESSING PURGED WORKLOADS

(71) Applicant: Hewlett Packard Enterprise Development LP, Houston, TX (US)

(72) Inventors: Thavamaniraja Sakthivel, Bangalore Karnataka (IN); Siva Subramaniam Manickam, Bangalore Karnataka (IN); Vinnarasu Ganesan, Bangalore Karnataka (IN); Sriram Padmachetty Harinath, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 89 days.

(21) Appl. No.: 17/303,644

(22) Filed: Jun. 3, 2021

(65) Prior Publication Data

US 2022/0391251 A1 Dec. 8, 2022

(51) Int. Cl.
*G06F 9/46* (2006.01)
*G06F 9/50* (2006.01)

(52) U.S. Cl.
CPC ............ *G06F 9/505* (2013.01); *G06F 9/5011* (2013.01); *G06F 9/5038* (2013.01); *G06F 9/5077* (2013.01); *G06F 2209/501* (2013.01); *G06F 2209/5022* (2013.01); *G06F 2209/508* (2013.01)

(58) Field of Classification Search
CPC ...... G06F 9/505; G06F 9/5011; G06F 9/5038; G06F 9/5077; G06F 2209/501; G06F 2209/5022; G06F 2209/508
See application file for complete search history.

(56) References Cited

U.S. PATENT DOCUMENTS

| | | | |
|---|---|---|---|
| 9,043,454 B2 | 5/2015 | Elyashev et al. | |
| 9,311,121 B2 | 4/2016 | Deshpande et al. | |
| 9,529,613 B2 | 12/2016 | Muller et al. | |
| 10,430,219 B2* | 10/2019 | Keller | G06F 9/45558 |
| 2016/0378536 A1* | 12/2016 | Kuribayashi | G06F 9/45558 718/1 |
| 2018/0013651 A1* | 1/2018 | Lang | H04L 67/1027 |
| 2019/0199609 A1* | 6/2019 | Hammerle | H04L 43/028 |
| 2019/0265998 A1* | 8/2019 | Shantamurty | G06F 9/45558 |

FOREIGN PATENT DOCUMENTS

JP 2019185511 A * 10/2019

OTHER PUBLICATIONS

Amazon Web Services, Inc., "Amazon CloudWatch Features", retrieved on May 28, 2021, 9 pages, retreived from internet at https://aws.amazon.com/cloudwatch/features/.
Commvault; "VM Archiving for VMware"; Mar. 13, 2019; 18 pages.
Ohayon, I., "Shut Down idle VM's [Azure]", EuropeClouds.com, Jun. 11, 2020, 9 pages, retrieved from internet at https://www.europeclouds.com/blog/shut-down-idle-vms-azure.

* cited by examiner

*Primary Examiner* — Diem K Cao
(74) *Attorney, Agent, or Firm* — Slater Matsil, LLP

(57) ABSTRACT

Examples described herein relate to a method and a system, for example, a workload controller, for accessing purged workloads. An alert indicative of an attempt to access a purged workload of workloads deployed in a workload environment may be received by the workload controller. The purged workload may include one or both of a deactivated workload or an archived workload. The workload controller may detect the attempt to access the purged workload based on port mirrored data traffic. Further, in some examples, the workload controller may activate the purged workload based on the alert.

17 Claims, 5 Drawing Sheets

ACCESSING PURGED WORKLOADS

BACKGROUND

Data and/or applications may be hosted on computing nodes, such as a server, a storage array, a cluster of servers, a computer appliance, a workstation, a storage system, a converged system, a hyperconverged system, or the like. In some implementations, several resources of the computing nodes may be virtualized and deployed as virtual machines, containers, pods, or the like, which may act as virtual resources. Such virtual resources can also host data and/or applications.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
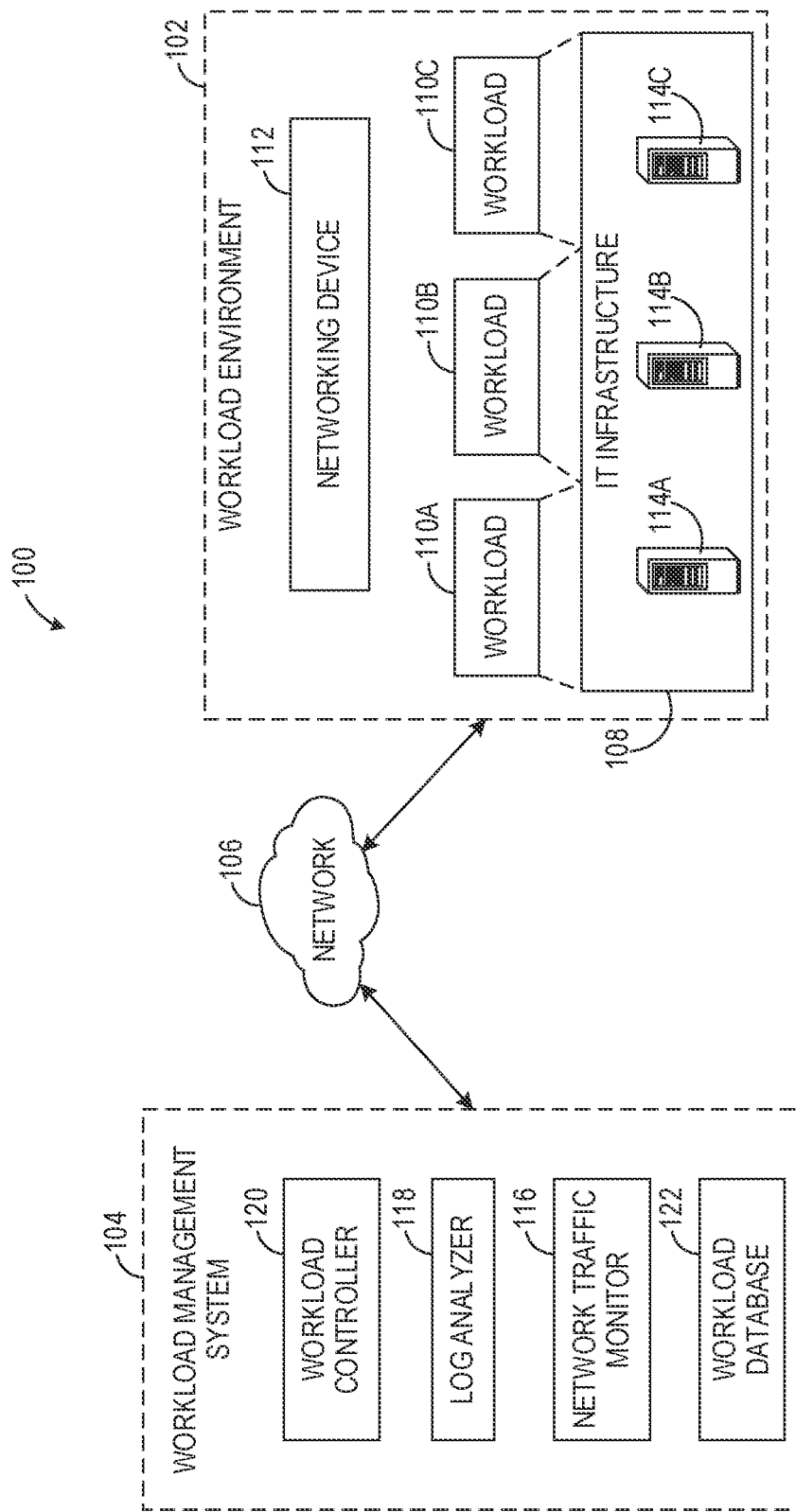
FIG. 1 depicts an example network environment including a workload environment and a workload management system for managing workloads deployed in the workload environment.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data and/or applications may be hosted on computing nodes, such as a server, a storage array, a cluster of servers, a computer appliance, a workstation, a storage system, a converged system, a hyperconverged system, or the like. In some implementations, resources of the computing nodes may be virtualized and deployed as workloads on physical computing nodes. One or more applications may be executed on the virtual resources (also referred to as software resources), which are in turn executing on physical hardware-based processing resources. The term workload may refer to a virtual resource including, but not limited to, a virtual machine (VM), a container, a pod, a database, a data store, a logical disk. As will be understood, a workload such as a VM may be an instance of an operating system hosted on a given computing node via a VM host programs such as a hypervisor. Further, a workload such as a container may be a packaged application with its dependencies (e.g., operating system resources, processing allocations, memory allocations, etc.) hosted on a given computing node via a container host programs such as a container runtime (e.g., Docker Engine), for example. Further, in some examples, one or more containers may be grouped to form a pod. For example, a set of containers that are associated with a common application may be grouped to form a pod.

A user can deploy and manage the workloads on one or more physical systems (e.g., the computing nodes) using workload management systems, such as, the VM host programs, container runtime, a container orchestration system (e.g. Kubernetes), and the like. For example, in a cloud environment, customers (e.g., authorized users of the cloud environment) may create workloads and manage the workloads in a self-service manner. The workloads may be used to host user applications and data. In certain cases, after a certain period of usage, some workloads may remain underutilized or remain idle. Such, underutilized or idle workloads may unnecessarily occupy system resources such as compute, memory, and network capabilities of the computing nodes hosting the workloads. In certain implementations, the customers may be charged based on the system resources that the customers' workloads occupy, irrespective of the utilization of the workloads. Accordingly, such underutilized and/or idle workloads may increase an operational cost for the customer.

Some solutions aid the users in gaining system-wide visibility into resource utilization, application performance, and operational health of the workloads. Moreover, using such solutions, the users can set alarms and automate actions for the workloads based on either predefined thresholds, or on machine learning algorithms that identify anomalous behavior related to the workloads. Further, certain other traditional solutions allow the customers to automate the shutdown of virtual machines (VMs) based on compute utilization (e.g., CPU utilization) by the VMs. In certain instances, once the VMs are shutdown or deactivated, such VMs may not be accessible and data traffic directed to such VMs may be dropped.

To that end, in accordance with the aspects of the present disclosure, a workload management system is presented that overcomes one or more challenges described hereinabove. In some examples, the workload management system may include a network traffic monitor that may generate a data traffic log based on received data traffic directed to workloads via a networking device coupled to the workloads. In one example, the network traffic monitor may be port-mirrored to the networking device to receive the data traffic from the networking device. Further, in some examples, the workload management system may include a log analyzer that may receive the data traffic log generated by the network traffic monitor and generate an alert if an attempt to access a purged workload of the workloads is detected based on the data traffic log. The purged workload may include one or both of deactivated workloads or archived workloads. Moreover, in some examples, the workload management system may include a workload controller that may activate the purged workload based on the alert received from the log analyzer.

Further, in accordance with certain aspects, the workload controller may be configured to perform a purging of underutilized workloads in a phased manner. For example, to aid in such phased purging, the workload controller may first identify any underutilized workloads depending on a respective workload utilization metric. The workload controller 120 may determine the workload utilization metric for each workload based on measured values of one or more performance parameters such as, but not limited to, compute utilization, memory utilization, disk input-output (IO), network IO, and the like. The term "compute utilization" (also referred to as CPU utilization) as used herein may refer to a percentage of total compute (CPU) cycles used by a given workload. Further, the term "memory utilization" as used herein may refer to a percentage of a main memory (e.g., Random Access Memory (RAM)) occupied by the given workload. Furthermore, the term "disk IO" may refer to read or write or input/output operations involving a physical disk. In other words, disk IO may refer to a speed at which the data transfer takes place between the hard disk drive and the main memory, or between hard disk drives corresponding to the given workload. The term "network IO" as used herein may refer to number of bytes of data received/transmitted per second through a networking device for the given workload.

Also, in some examples, the workload controller may have an access to a policy database that stores a purge policy. The purge policy may include policy data including values of a threshold underutilized percentage corresponding to each of the performance parameters and a workload under-utilization threshold. Further, the policy data may also include values of a first duration to mark a given workload of the workloads underutilized, a second duration to deactivate the given workload, a third duration to archive the given workload, or a fourth duration to remove the given workload. The terms first, second, third, fourth, etc. may be used herein to distinguish between different durations without indicating an order. Also, the purge policy may include policy criteria defining how the phase purging of the underutilized workloads is to be performed by the workload controller based on the policy data.

In accordance with the purge policy, in some examples, the workload controller may tag a given workload as an underutilized workload if the workload utilization metric of the given workload remains below the workload underutilization threshold for the first duration. Further, in some examples, the workload controller may deactivate the given workload if the given workload remains underutilized for the second duration after the given workload is tagged as the underutilized workload. Further, in some examples, the workload controller may archive the given workload if the given workload remains in a deactivated state for the third duration after the given workload has been deactivated. Moreover, in some examples, the workload controller may remove the given workload if the given workload remains in an archived state for the fourth duration after the given workload has been archived.

As will be appreciated, the workload management system may reactivate a purged workload based on detection of attempted access to the purged workload with minimal downtime. This is achieved by monitoring the data traffic logs captured using port mirroring networking devices in the path of the workloads. This may ensure that there is a fine balance between operational cost savings and optimum availability of the workloads for a customer. Also, in some examples, the workload controller identifies underutilized workloads based on several performance parameters including, but not limited to, compute utilization, memory utilization, disk IO, network IO, and performs a purging of the identified underutilized workloads in a phased manner based on the defined purge policy. Such a phased purging of the underutilized workloads may provide ample opportunities for an administrator to retrieve the underutilized workload if needed at a later point in time, along with savings in operational costs.

Referring now to the drawings, in FIG. 1, an example network environment 100 is presented. The network environment 100 may include a workload environment 102 and a workload management system 104. In some examples, the workload management system 104 may be located outside of the workload environment 102 and communicate with the workload environment 102 via a network 106, as depicted in FIG. 1. However, the scope of the present disclosure should not be limited to the implementation depicted in FIG. 1. In certain examples, the workload management system 104 may be deployed within the workload environment 102, without limiting the scope of the present disclosure. The workload environment 102 may be an on-premise network infrastructure of an entity (e.g., an individual or an organization or enterprise), a private cloud network, a public cloud network, or a hybrid public-private cloud network.

In some examples, the workload environment 102 may include an IT (information technology) infrastructure 108 hosting one or more workloads, such as workloads 110A, 110B, and 110C (hereinafter collectively referred to as workloads 110A-110C). The IT infrastructure 108 and the workloads 110A-110C may be accessible via a networking device 112. Also, the IT infrastructure 108 and the workloads 110A-110C may communicate with any system or device outside of the workload environment 102 via the networking device 112. The IT infrastructure 108 may be a network of IT resources hosted at the workload environment 102. In one example, the IT infrastructure 108 may be a data center hosted at the workload environment 102. Examples of the IT resources hosted in the IT infrastructure 108 may include, but are not limited to, servers, storage devices, desktop computers, portable computers. The servers may be blade servers, for example. The storage devices may be storage blades, storage disks, or storage enclosures, for example. For illustration purposes, the IT infrastructure 108 is shown to include a plurality of servers 114A, 114B, and 114C (hereinafter collectively referred to as servers 114A-114C). It is to be noted that the scope of the present disclosure is not limited with respect to the number or type of IT resources deployed in the IT infrastructure 108. For example, although three servers 114A-114C are depicted in FIG. 1, the use of one or more servers is envisioned within the purview of the present disclosure. One or more of the IT resources (e.g., the servers 114A-114C) may allow operating systems, applications, and/or application management platforms (e.g., workload hosting platforms—such as, a hypervisor, a container runtime, a container orchestration system, and the like) to run thereon.

In some examples, the workloads 110A-110C may be hosted on one or more of the IT resources (e.g., the servers 114A-114C). Examples of the workloads 110A-110C may include, but are not limited to, VMs, containers, pods, or the like. In the description hereinafter, for illustration purposes, the workloads 110A-110C are described as being VMs that are hosted on one or more of the servers 114A-114C using hypervisors (not shown) running on the servers 114A-114C. A hypervisor may be a computer program, firmware, or hardware that may facilitate hosting of one or more operating system instances on a computing system such as the servers 114A-114C. Such operating system instance hosted or installed on the hypervisor may be referred to as a virtual machine. Accordingly, the hypervisor may provide a host operating system for the virtual machine. The hypervisor may be type-1 hypervisor (also referred to as "bare-metal hypervisor") or type-2 (also referred to as "hosted hypervisor"). In some examples, a hypervisor may be deployed on each of the servers 114A-114C. Accordingly, the workloads 110A-110C (in this case, VMs) may be hosted on one or more of the servers 114A-114C by the respective hypervisors. In one example, the workloads 110A, 110B, and 110C may be deployed respectively on the servers 114A, 114B, and 114C. In certain examples, some or all of the workloads 110A-110C may be hosted on a single server, without limiting the scope of the present disclosure. Also, in some examples, the workloads 110A-110C may have respective IP addresses at which the workloads 110A-110C are reachable.

The networking device 112 may be a network communication device acting as a point of access to the IT infrastructure 108 and the workloads 110A-110C hosted on the IT infrastructure 108. Any data traffic directed to the IT infrastructure 108 and the workloads 110A-110C may flow to the IT infrastructure 108 and the workloads 110A-110C via the networking device 112. In some examples, each of the servers 114A-114C may be physically (e.g., via wires) or wirelessly connected to the networking device 112. Also, the workloads 110A-110C may be logically mapped to the networking device 112 so that the workload 110A-110C can send (e.g., to other workloads within the workload environment 102 to devices/systems external to the workload environment 102) and/or receive data traffic (e.g., from other workloads within the workload environment 102 to the devices/systems external to the workload environment 102) via the networking device 112. In particular, in some examples, the networking device 112, may be in communication with the network 106, directly or via intermediate communication devices (e.g., a router or an access point). In one example, the networking device 112 may be a network switch (physical or logical). In some examples, the networking device 112 may interconnect the servers 114A-114C in the IT infrastructure 108 using packet switching techniques to enable data communication therebetween and with any other device (e.g., a router or an access point) connected to the networking device 112.

Communication between the workload management system 104 (described later) and the workload environment 102 may be facilitated via the network 106. Examples of the network 106 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. In some examples, the network 106 may include one or more network switches, routers, or network gateways to facilitate data communication. Communication over the network 106 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 106 may be enabled via a wired (e.g., copper, optical communication, etc.) or wireless (e.g., Wi-Fi®, cellular communication, satellite communication, Bluetooth, etc.) communication technologies. In some examples, the network 106 may be enabled via private communication links including, but not limited to, communication links established via Bluetooth, cellular communication, optical communication, radio frequency communication, wired (e.g., copper), and the like. In some examples, the private communication links may be direct communication links between the workload management system 104 and the workload environment 102.

Further, in some examples, the workload management system 104 may facilitate the creation and/or management of the workloads 110A-110C in the workload environment 102. The workload management system 104 may enable a user interface via input-output devices (e.g., display, keyboard, etc.—not shown), by which a user can create one or more workloads 110A-110C and/or manage the lifecycle of the workloads 110A-110C remotely from the workload management system 104, in some examples. In certain cases, after a certain period, one or more of the workloads 110A-110C may remain underutilized or remain idle. As will be understood, workloads that remain underutilized or idle may unnecessarily occupy system resources such as compute, memory and network capabilities of the computing nodes hosting the workloads. In certain implementations, the customers may be charged based on the system resources that the customers' workload occupies, irrespective of the utilization of the workloads. Accordingly, such underutilized and/or idle workloads may increase an operational cost for the customer. In accordance with certain aspects of the present disclosure, the workload management system 104 may aid in a phased purging (an example is described in conjunction with FIG. 4) of the underutilized workloads of the workloads 110A-100C so that the customer or the user of the underutilized workloads may save on the operational costs associated with the underutilized workloads. Also, in some examples, the workload management system 104 may continuously monitor any attempt to access a purged workload and automatically reactivate the purged workload. Such reactivation of the purged workload may resume services/functionalities offered by the purged workload.

To aid in such functionalities performed by the workload management system 104, in some examples, the workload management system 104 may include a network traffic monitor 116, a log analyzer 118, a workload controller 120, and a workload database 122. In some examples, each of the network traffic monitor 116, the log analyzer 118, and the workload controller 120 may be implemented as virtual resources that execute on hardware-based processing resources. Example virtual resources include VMs, containers, container pods, or software applications. In other examples, each of the network traffic monitor 116, the log analyzer 118, and the workload controller 120 may be implemented on hardware resources such as a computing system, server, a special purpose device accessible via the network 106, or the like. In some examples, some of the network traffic monitor 116, the log analyzer 118, and the workload controller 120 may be implemented as virtual resources, and the rest may be implemented as hardware resources. In some cases, the workload management system 104 may be a physical computing node, and the network traffic monitor 116, the log analyzer 118, and the workload controller 120 may be hosted as virtual resources on the workload management system 104. In some examples, the network traffic monitor 116, the log analyzer 118, and the workload controller 120 may be deployed as virtual resources on separate physical computing nodes.

In some examples, the network traffic monitor 116 may be port-mirrored with the networking device 112. In some examples, the port mirroring between the network traffic monitor 116 and the networking device 112 may be enabled by configuring one or more port mirroring rules into the networking device 112. In particular, the network traffic monitor 116 may communicate with the networking device 112 on a dedicated port on the networking device 112. The dedicated port through which the network traffic monitor 116 communicates with the networking device 112 is hereinafter referred to as a mirror port. An example port mirroring rule that can be configured in the networking device 112 may define that any data traffic directed to the workloads 110A-110C are also forwarded to the mirror port. Accordingly, the network traffic monitor 116 may receive the data traffic directed to the workloads 110A-110C from the networking device 112 through the mirror port. In another example, the workloads 110A-110C may communicate with the networking device 112 via the respective communication port (hereinafter referred to as workload communication ports) on the networking device 112. Accordingly, a port mirroring rule may define that any data traffic directed to the workload communication ports is also forwarded to the mirror port, through which the data traffic may reach the network traffic monitor 116. The data traffic received by the network traffic monitor 116 from the mirror port of the networking device 112 is referred to as port mirrored data traffic. Further, in some examples, the network traffic monitor 116 may generate a data traffic log based on the data traffic received from the networking device 112.

The workload controller 120 may maintain the workload database 122 storing information about the workloads 110A-110C. The workload database 122 may be an organized collection of data regarding the workloads 110A-110C. The workload database 122 may be stored in a local storage media (e.g., a storage device, server, computing node, etc.) associated with the workload management system 104 or on a storage media accessible by the workload management system 104. Information in the workload database 122 may be organized into tables, rows, or columns, maybe in an indexed form so the information is easily accessible by the workload controller 120, in some example. In some examples, the workload database 122 may be hosted on a virtual data store that includes aspects (e.g., addressing, configurations, etc.) abstracted from data stored in a physical storage device/system (not shown). The data store hosting the workload database 122 may be presented to a user environment (e.g., to the virtual machines such as the workload controller 120, an operating system, applications, processes, etc.).

In some examples, the information about the workloads 110A-110C stored in the workload database 122 may include configuration details (e.g., workload type/application type) and an operational status corresponding to the workloads 110A-110C. Additional details regarding the workload database 122 are described in conjunction with FIG. 4. For a given workload of the workloads 110A-110C, the operational status may represent one of the tags form "active workload," "underutilized workload," "deactivated workload," or "archived workload." The workloads that are deactivated (i.e., workloads that are tagged as deactivated workloads) or the workloads that are archived (i.e., workloads that are tagged as archived workloads) are also, individually or collectively, referred to as purged workloads. In some examples, the workload controller 120 may configure one or more alert definitions corresponding to the purged workloads in the log analyzer 118. In some examples, the alert definitions may include identification information (e.g., IP address) corresponding to the purged workloads.

The log analyzer 118 may access the data traffic log generated by the network traffic monitor 116. Further, in some examples, the log analyzer 118 may generate an alert if an attempt to access a purged workload of the workloads 110A-110C is detected based on the data traffic log generated by the network traffic monitor 116 and the one or more alert definitions. In particular, the log analyzer 118 may analyze the data traffic log to determine if the data traffic log comprises data traffic directed to the purged workload by searching for any data traffic that is destined to the IP address of the purged workload. In response to determining that the data traffic log includes the data traffic directed to the purged workload, the log analyzer 118 may determine that the attempt to access the purged workload has been made and the log analyzer 118 may generate the alert for the workload controller 120. Moreover, in some examples, the workload controller 120 may activate the purged workload based on the alert received from the log analyzer 118. Additional details of the operations performed by the workload controller 120 are described in conjunction with methods described in FIGS. 4 and 5.

Figure 2:
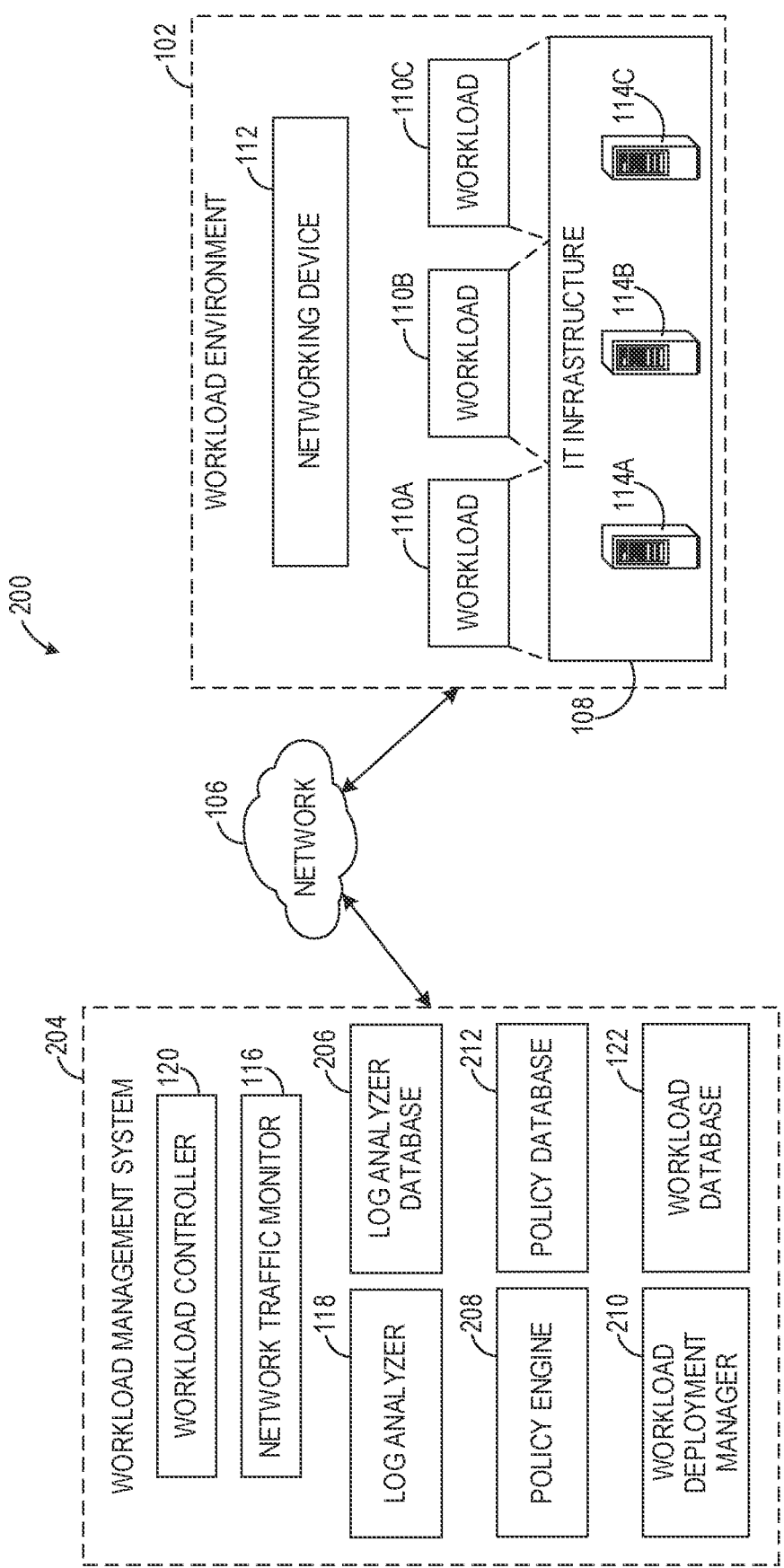
FIG. 2 depicts a network environment including a workload environment and a workload management system for managing workloads deployed in the workload environment, in accordance with another example.

Turning now to FIG. 2, a network environment 200 is presented, in accordance with another example. The network environment 200 may include a workload environment 102 and a workload management system 204 for managing workloads 110A-110C deployed in the workload environment 102. The depicted in FIG. 2, the network environment 200 may include certain components that are similar to the components described with reference to the network environment 100 of FIG. 1 and are marked with the same reference numerals as used in FIG. 1. The workload management system 204 may be representative of one example of the workload management system 104 of FIG. 1 and may be implemented in a similar fashion as the workload management system 104 described in conjunction with FIG. 1. In the example implementation of FIG. 2, the workload management system 204 may include the network traffic monitor 116, the log analyzer 118, the workload controller 120, the workload database 122, a log analyzer database 206, a policy engine 208, a workload deployment manager 210, and a policy database 212.

The log analyzer database 206 may store the data traffic received by the network traffic monitor 116 in an organized form (e.g., in the form of files, tables, rows, columns, etc.). The log analyzer database 206 may be implemented in a similar fashion as that of the workload database 122 described in FIG. 1. In some examples, the network traffic monitor 116 may store all the data traffic that is received from the networking device 112 deployed in the workload environment 102. The log analyzer 118 may retrieve the network traffic from the log analyzer database 206 to search for any data traffic directed to the purged workloads and to generate an alert for the workload controller 120 if the data traffic directed to the purged workloads is identified. The log analyzer 118 may clean-up, from the log analyzer database 206, data traffic logs that are older than a predefined retention period defined by a user/administrator.

In some examples, the policy engine 208 and the workload deployment manager 210 may be implemented as virtual resources (e.g., VMs, containers, pods, or applications running on computing nodes) or hardware (e.g., computing systems, servers, a special purpose devices accessible via the network 106). In some examples, the policy engine 208 may enable a user interface via input-output devices (e.g., display, keyboard, etc.—not shown), by which a user can define a purge policy that is used by the workload controller 120 to purge underutilized workloads of the workloads 110A-110C in a phased manner. The purge policy may include policy data (see Table-1A) and purge criteria (see Table-1B). In some examples, the purge policy including the policy data and purge criteria may be stored in a policy database 212. The policy database 212 may be implemented in a similar fashion as the workload database 122, in one example. The policy data may include values of a threshold underutilized percentage corresponding to each of the performance parameters such as, but not limited to, compute utilization (also referred to as CPU utilization), memory utilization, disk IO, network IO, and the like. Further, the policy data may also include information corresponding to a first duration (D1) to mark a given workload of the workloads underutilized, a second duration (D2) to deactivate the given workload, a third duration (D3) to archive the given workload, or a fourth duration (D4) to remove the given workload. Also, in some examples, the policy data may include a value of a workload underutilization threshold ($W_{Threshold}$) based on which the workload controller 120 may determine that a given workload is underutilized (an example of which is described in the method of FIG. 4).

TABLE 1A

Example policy data of the purge policy

| Parameter | Value |
| --- | --- |
| D1 | 7 Days |
| D2 | 14 Days |
| D3 | 21 Days |
| D4 | 30 Days |
| $CPU_{Threhsold}$ | 10% |
| $Memory_{Threhsold}$ | 20% |
| $Disk_{Threhsold}$ | 5 operations/second |
| $NW_{Threhsold}$ | 15 operations/second |
| $W_{Threshold}$ | 0.4 |

In Table-1A, $CPU_{Threshold}$ represents a threshold underutilization percentage of the CPU utilization, $Memory_{Threshold}$ represents a threshold underutilization percentage of the memory utilization, $Disk_{Threshold}$ represents a threshold underutilization percentage of the disk IO, and $NW_{Threshold}$ represents a threshold underutilization percentage of the network IO. Further, in some examples, the purge criteria of the purge policy may define how to purge underutilized workloads based on the policy data. Table-1B presented below represents example policy criteria.

TABLE 1B

Example purge criteria of the purge policy

| Criteria | Action |
| --- | --- |
| Underutilization criterion | Tag a workload an underutilized workload if the workload remains underutilized for the first duration D1 |
| Deactivation criterion | Deactivate the workload if the workload remains underutilized for the second duration D2 after the workload is tagged underutilized |
| Archival criterion | Archive the workload if the workload remains deactivated for the third duration D3 after the workload is deactivated |
| Cleaning criterion | Remove/Clean the workload if the workload remains archived for the fourth duration D4 after the workload is archived |

Although four purge criteria (e.g., the underutilization criterion, deactivation criterion, archival criterion, and cleaning criterion) are illustrated in the example purge criteria of the purge policy presented in Table-1B, the purge policy, in accordance with some examples, may include a greater or fewer number of criteria, without limiting the scope of the present disclosure. In some examples, the workload controller 120 may enforce the purge policy by performing actions corresponding to the purge criteria defined in the purge policy depending on the utilization of the workloads 110A-110C, and example of which is described in conjunction with the method of FIG. 4.

Moreover, in some examples, the workload deployment manager 210 may aid the workload controller 120 in enforcing the purge policy and in reactivating the purged workload if an attempt to access the purged workload is detected. The workload deployment manager 210 may power-on a given workload (also referred to as activation of the given workload), shutdown the given workload (also referred to as deactivation of the given workload), archive the given workload, and/or remove/clean the given workload by sending one or more commands to one or more of the workloads 110A-110C to or the respective host programs (e.g., hypervisors running the workloads 110A-110C) under control of the workload controller 120, an example of which is described in conjunction with the methods described in FIGS. 4 and 5.

Figure 3:
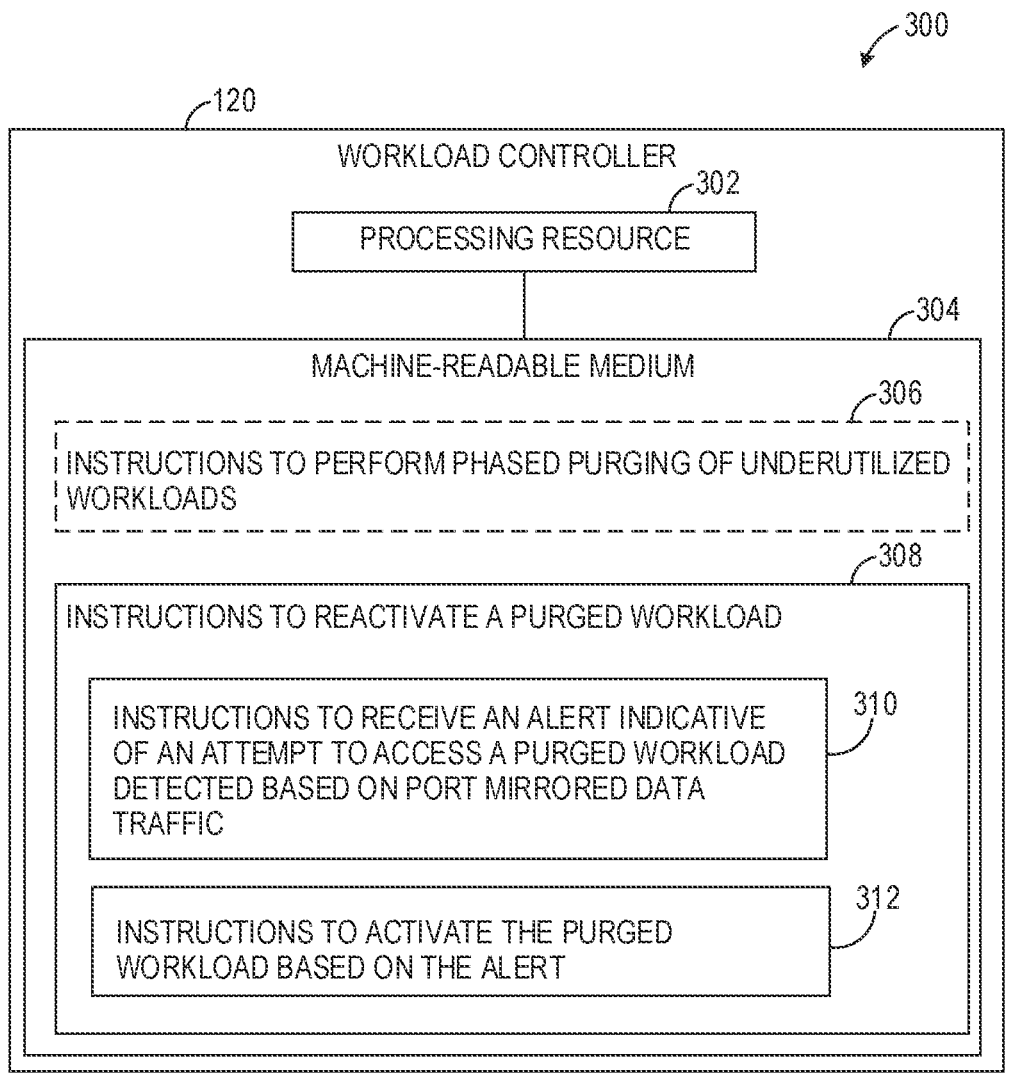
FIG. 3 depicts a block diagram of a workload controller deployed in a workload management system, in accordance with an example.

Referring now to FIG. 3, a block diagram 300 of a workload controller (e.g., the workload controller 120) is presented, in accordance with an example. In some examples, the workload controller 120 may be a processor-based system that performs various operations to perform a phased purging of underutilized workloads and/or reactivation of purged workloads. In some examples, the workload controller 120 may be a device including a processor or a microcontroller and/or any other electronic component, or a device or system that may facilitate various compute, data storage, and/or data processing, for example. In certain other examples, the workload controller 120 may be deployed as a virtual resource, for example, a VM, a container, a containerized application, or a pod in the workload management system 104.

In some examples, the workload controller 120 may include a processing resource 302 and a machine-readable medium 304. The machine-readable medium 304 may be any electronic, magnetic, optical, or other physical storage device that may store data and/or executable instructions 306 and/or 308. For example, the machine-readable medium 304 may include one or more of a RAM, an Electrically Erasable Programmable Read-Only Memory (EEPROM), a storage drive, a flash memory, a Compact Disc Read Only Memory (CD-ROM), or the like. The machine-readable medium 304 may be non-transitory. As described in detail herein, the machine-readable medium 304 may be encoded with the executable instructions 306 to perform operations at one or more blocks of the method described in FIG. 4 and/or instructions 308 to perform operations at one or more blocks of the method described in FIG. 5.

Further, the processing resource 302 may be a physical device, for example, one or more central processing unit (CPU), one or more semiconductor-based microprocessors, microcontrollers, one or more graphics processing unit (GPU), application-specific integrated circuit (ASIC), a field programmable gate array (FPGA), other hardware devices capable of retrieving and executing instructions 306 and/or 308 stored in the machine-readable medium 304, or combinations thereof. The processing resource 302 may fetch, decode, and execute the instructions 306 and/or 308 stored in the machine-readable medium 304 to perform the phased purging of underutilized workloads and/or reactivation of the purged workloads. As an alternative or in addition to executing the instructions 306 and/or 308, the processing resource 302 may include at least one integrated circuit (IC), control logic, electronic circuits, or combinations thereof that include a number of electronic components for performing the functionalities intended to be performed by the workload controller 120. Moreover, in certain examples, where the workload controller 120 may be implemented as the virtual resource, the processing resource 302 and the machine-readable medium 304 may represent a processing resource and a machine-readable medium of hardware or a computing system that hosts the workload controller 120 as the virtual resource.

In some examples, the instructions 306 when executed by the processing resource 302 may cause the processing resource 302 to perform the phased purging of underutilized workloads of the workloads 110A-110C. Details of the operations carried out by the workload controller 120 to perform the phased purging of the underutilized workloads are described in conjunction with the method described in FIG. 4. Further, in some examples, the instructions 308 when executed by the processing resource 302 may cause the processing resource 302 to reactivate a purged workload. In some examples, the instructions 308 may include instructions 310 and 312. The instructions 310 when executed by the processing resource 302 may cause the processing resource 302 to receive, from the log analyzer 118, an alert indicative of an attempt to access a purged workload. Further, the instructions 312 when executed by the processing resource 302 may cause the processing resource 302 to activate the purged workload based on the alert. Details of the operations carried out by the workload controller 120 to reactivate the purged workloads are described in conjunction with the method described in FIG. 5.

Figure 4:
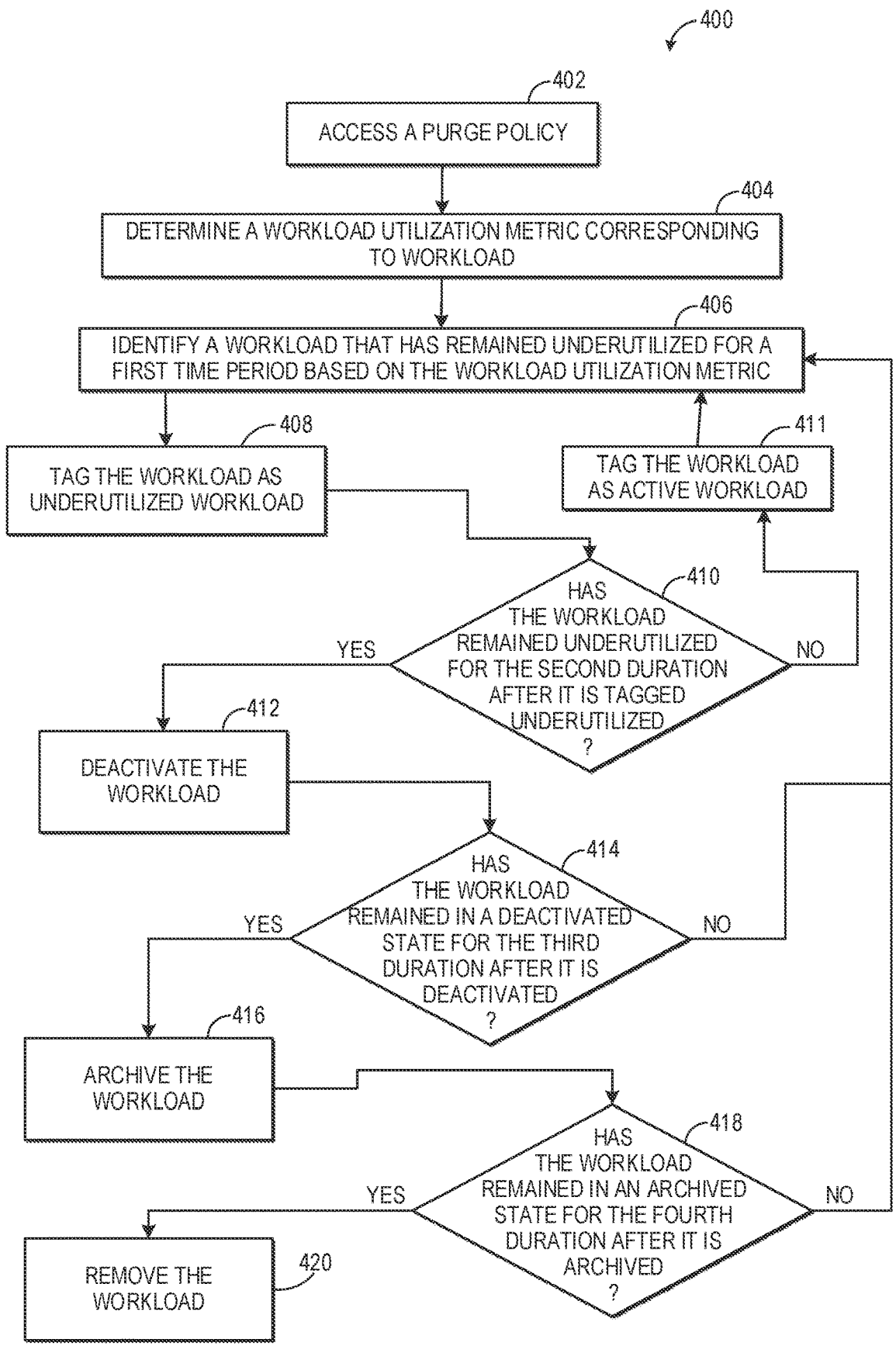
FIG. 4 depicts a flow diagram of a method for performing a phased purging of underutilized workloads, in accordance with an example.
Figure 5:
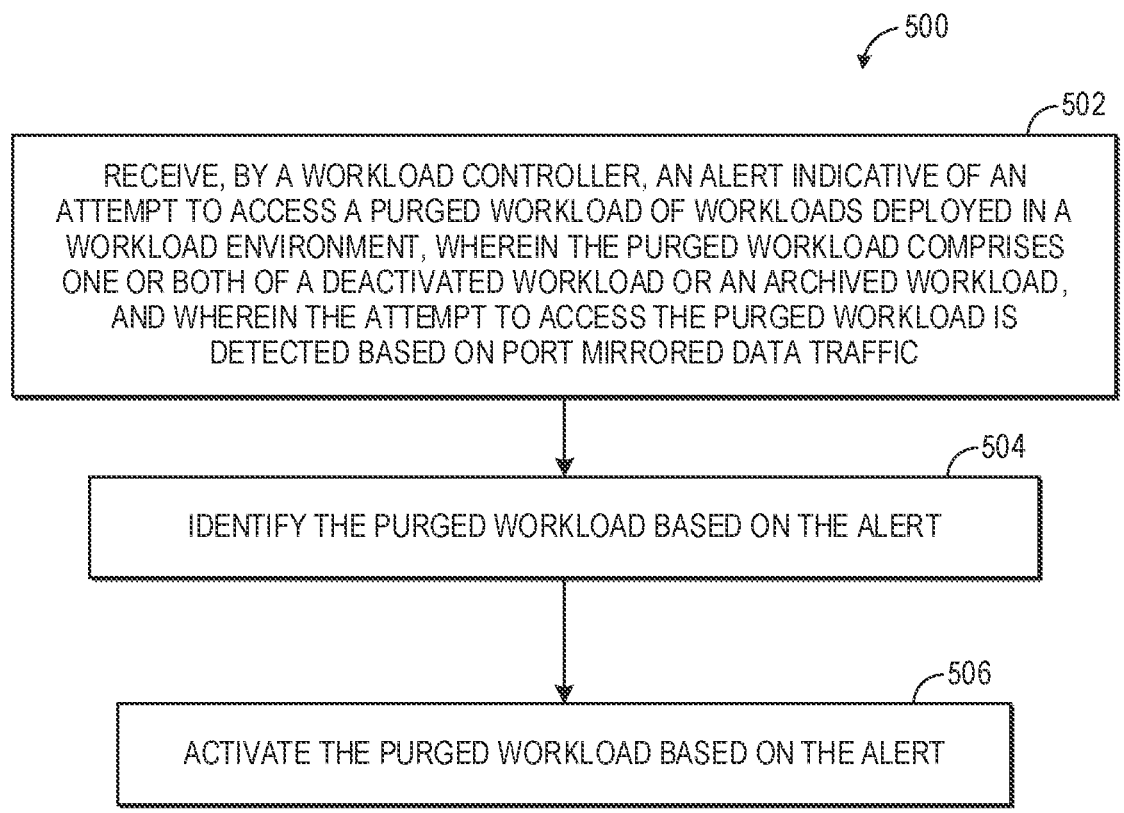
FIG. 5 depicts a flow diagram of a method for reactivating a purged workload, in accordance with an example.

In the description hereinafter, several operations performed by the workload controller 120 will be described with help of flow diagrams depicted in FIGS. 4 and 5. For illustration purposes, the flow diagrams, depicted in FIGS. 4 and 5, are described in conjunction with the network environments 100 and 200 depicted in FIGS. 1-2 and the block diagram 300 of FIG. 3, however, the methods of FIGS. 4 and 5 should not be construed to be limited to the example configurations of the network environments 100 and 200. The methods described in FIGS. 4 and 5 include a plurality of blocks, operations at which may be performed by a processor-based system such as, for example, the workload controller 120. In particular, operations at each of the plurality of blocks may be performed by a processing resource such as the processing resource 302 by executing one or more of the instructions 306 and/or 308 stored in the machine-readable medium 304. In particular, the methods described in FIGS. 4 and 5 may represent an example logical flow of some of the several operations performed by the workload controller 120. However, in some other examples, the order of execution of the blocks depicted in FIGS. 4 and 5 may be different than the order shown. For example, the operations at various blocks may be performed in series, in parallel, or a series-parallel combination.

Referring now to FIG. 4, a flow diagram of a method 400 for performing a phased purging of underutilized workloads is presented, in accordance with an example. The method 400 may include blocks 402, 404, 406, 408, 410, 412, 414, 416, 418, and 420 (hereinafter collectively referred to as blocks 402-420) that are performed by the workload controller 120. In certain examples, operations at blocks 402-420 may be performed by the processing resource 302 by executing one or more of the instructions 306 stored in the machine-readable medium 304.

At block 402, the workload controller 120 may access the purge policy from the policy database 212. As previously noted, the purge policy may include a policy data (e.g., data represented in Table-1A) and the purge criteria (e.g., data represented Table-1B). Further, at block 404, the workload controller 120 may determine a workload utilization metric corresponding to the workloads 110A-110C. The workload utilization metric may be representative of a measure of the deviation of one or more performance parameters (e.g., CPU utilization, memory utilization, disk input-output (IO), network IO, or the like) from the respective threshold underutilized percentages set by the user in the policy data. In one example, the workload utilization metric may be determined using an example relationship of equation (1).

$$W_m = \text{MAX}(\text{PFCPU}, \text{PFMemory}, \text{PFDisk}, \text{PFNW}) \quad \text{Equation (1)}$$

where, for a given workload, $W_m$ represents the workload utilization metric, PFCPU represents a peak factor for the CPU utilization, PFMemory represents a peak factor for the memory utilization, PFDisk represents a peak factor for the disk IO, and PFNW represent a peak factor for the network IO. In some examples, as depicted in equation (s), the workload utilization metric may be determined as the maximum of the PFCPU, PFMemory, PFDisk, and PFNW. In the example presented hereinabove, although the workload utilization metric is computed based on four performance parameters (e.g., the CPU utilization, the memory utilization, the disk IO, and the network IO), the workload utilization metric may be determined based on a greater or fewer number of performance parameters, without limiting the scope of the present disclosure.

In some examples, peak factor may be defined as the deviation of a performance parameter from the threshold underutilized percentage for that parameter. For example, PFCPU, PFMemory, PFDisk, and PFNW may be determined using example relationships depicted in equations 2, 3, 4, and 5 represented below.

$$PFCPU = \frac{(CPU_{measured} * CPU_{Threshold})}{100} \quad \text{Equation (2)}$$

$$PFMemory = \frac{(Memory_{measured} * Memory_{Threshold})}{100} \quad \text{Equation (3)}$$

-continued $$PFDisk = \frac{(Disk_{measured} * Disk_{Threshold})}{100} \quad \text{Equation (4)}$$

$$PFNW = \frac{(NW_{measured} * NW_{Threshold})}{100} \quad \text{Equation (5)}$$

In equations 2-5 presented hereinabove, $CPU_{measured}$ represents a measured value (e.g., percentage) of the CPU utilization, $Memory_{measured}$ represents a measured value (e.g., percentage) of the memory utilization, $Disk_{measured}$ represents a measured value (e.g., operations/second) of the disk IO, and $NW_{measured}$ represents a measured value (e.g., operations/second) of the network IO. The workload controller 120 may obtain the values of the $CPU_{Threshold}$, $Memory_{Threshold}$, $Disk_{Threshold}$, and $NW_{Threshold}$ from the policy data (e.g., Table-1A) of the purge policy. By way of example, if the measured values of the CPU utilization, the memory utilization, the disk IO, and the network IO are respectively 20%, 2.5%, 30 operations/second, and 7 operations/second, the PFCPU, PFMemory, PFDisk, and PFNW maybe determined as being 2.0, 0.5, 1.5, 1.05, respectively corresponding to the policy data shown in Table-1A. Accordingly, the workload utilization metric may be determined as being 2.0 (i.e., the maximum value from 2.0, 0.5, 1.5, and 1.05).

The workload controller 120 may determine the workload utilization metric for each of the workloads 110A-110C in a similar fashion as described hereinabove. In some examples, the workload controller 120 may periodically recalculate the workload utilization metric for each of the workloads 110A-110C. Further, the workload controller 120 may determine a first average value of the workload utilization metric. The first average value of the workload utilization metric may represent an average value of the workload utilization metric for the first duration (e.g., 7 days) (see, example policy data of Table-1A). Table-2 represents the first average values of the workload utilization metric for the workloads 110A-110C for the first duration, in one example.

TABLE 2

Example first average values of the workload utilization metric

| Workload | First average value of $W_m$ |
| --- | --- |
| 110A | 2 |
| 110B | 0.35 |
| 110C | 0.3 |

Further, in some examples, at block 406, the workload controller 120 may identify one or more workloads of the workloads 110A-110C that have remained underutilized for the first duration based on the workload utilization metric. In some examples, to identify the one or more underutilized workloads, the workload controller 120, for each of the workloads 110A-110C, may perform a check to determine if the corresponding first average value of the workload utilization metric is below the workload underutilization threshold ($W_{Threshold}$) defined in the purge policy (see Table-1A, for example). If the first average value of the workload utilization metric for a workload is identified to be lower than the workload underutilization threshold, the workload controller 120 may determine that the workload is underutilized. An example value of the workload underutilization threshold defined in the purge policy is 0.4 (see Table-1A). Accordingly, in one example, the workload controller 120 may determine that the workloads 110B and 110C are underutilized workloads because the first average values of the workload utilization metric of the workloads 110B and 110C are below 0.4.

Furthermore, at block 408, the workload controller 120 may tag the workloads whose first average value of the workload utilization metric is identified to be lower than the workload underutilization threshold as underutilized workloads. In the ongoing example, the workload controller 120 may tag the workloads 110B and 110C as an underutilized workload. On the other hand, the workload controller 120 may tag the workloads having the first average value of the workload utilization metric greater than the workload underutilization threshold as active workload (e.g., the workload 110A). The workload controller 120 may store the tagging information of the workloads in the workload database 122. Further, in some examples, the workload controller 120 may periodically update the tagging information of the workloads 110A-110C based on the respective first average values of workload utilization metric. Table-3 presented below depicts example tagging of the workloads 110A-110C stored in the workload database 122.

TABLE 3

Example tagging of the workloads

| Workload | First average value of $W_m$ | Tag |
| --- | --- | --- |
| 110A | 2 | Active workload |
| 110B | 0.35 | Underutilized workload |
| 110C | 0.3 | Underutilized workload |

Furthermore, at block 410, the workload controller 120 may perform a check to determine if a given workload (e.g., the workloads 110B, 100C) remains underutilized for the second duration after the given workload is tagged as the underutilized workload. In some examples, at block 410, the workload controller 120 may compare a second average value of the workload utilization metric with the workload underutilization threshold. The second average value of the workload utilization metric may represent an average value of the workload utilization metric ($W_m$) for the second duration after the given workload is tagged as the underutilized workload. For the given workload, if the second average value of the workload utilization metric is identified to be lower than the workload underutilization threshold, at block 412, the workload controller 120 may determine that the given workload has remained underutilized for the second duration after the given workload is tagged as the underutilized workload. At block 410, if it is determined that the given workload has not remained underutilized for the second duration after the given workload is tagged as the underutilized workload, the workload controller 120, at block 411, may tag the given workload as an active workload and update the workload database 122 to change its tag from the "underutilized workload" to the "active workload". However, at block 410, if it is determined that the given workload has remained underutilized for the second duration after the given workload is tagged as the underutilized workload, the workload controller 120, at block 412, may deactivate the given workload and update the workload database 122 with a new tag—"Deactivated workload" and respective timestamp at which the given workload is deactivated. When the given workload is deactivated, the given workload is said to be in a deactivated state. Table-4 presented below represents an updated content of a workload database 122.

TABLE 4

Updated content of the workload database 122

| Workload | Second average value of $W_m$ | Tag | Deactivation Timestamp |
|---|---|---|---|
| 110A | 3 | Active workload | — |
| 110B | 0.3 | Deactivated workload | 2021-01-16 09:00:30 |
| 110C | 0.25 | Deactivated workload | 2021-02-14 11:00:15 |

As depicted in Table-4, the second average values of the workload utilization metric for the workloads 110B and 100C are lower than the workload underutilization threshold. Therefore, the workloads 110B and 100C are deactivated. Also, the workload database 122 may be updated with the respective new tags—"Deactivated workload" and timestamps at which the workloads 110B and 100C are deactivated.

In certain examples, as will be described in greater detail in FIG. 5, if an attempt to access a deactivated workload (e.g., the workloads 110B, 110C) is made, the workload controller 120 may reactivate such deactivated workload for which the attempt to access is made. The deactivated workloads that are not attempted to access may continue to remain in the deactivated state. Accordingly, at block 414, the workload controller 120 may perform a check to determine if the given workload (e.g., the workloads 110B, 100C) remained in the deactivated state for the third duration after it is deactivated. To perform such a check at block 414, the workload controller 120 may compare a current timestamp with the timestamp (e.g., the deactivation timestamp) at which the given workload was deactivated. If a difference between the current timestamp and the deactivation timestamp is greater than the third duration, the workload controller 120 may determine that the given workload remained in the deactivated state for the third duration after it is deactivated.

At block 414, if it is determined that the given workload has not remained in the deactivated state for the third duration after the given workload is deactivated, the workload controller 120 may continue to execute operation at block 406. However, at block 414, if it is determined that the given workload has remained in the deactivated state for the third duration after the given workload is deactivated, the workload controller 120, may at block 416, may archive the given workload and update the workload database 122 with a new tag—"Archived workload" and respective timestamp at which the given workload is archived. When the given workload is archived, the given workload is said to be in an archived state. Table-5 presented below represents an updated content of a workload database 122 after execution of the operation at block 416.

TABLE 5

Updated content of the workload database 122

| Workload | Tag | Deactivation Timestamp | Archival Timestamp | Current Timestamp |
|---|---|---|---|---|
| 110A | Active workload | — | — | — |
| 110B | Archived workload | 2021-01-16 09:00:30 | 2021-02-11 09:00:30 | 2021-02-15 09:00:30 |
| 110C | Deactivated workload | 2021-02-14 11:00:15 | — | 2021-02-15 09:00:30 |

As depicted in Table-5, the difference between the current timestamp and the deactivation timestamp for the workload 110B is 29 days which is greater than the third time duration (e.g., 17 days). Therefore, the workload controller 120 may archive the workload 110B. Also, the workload controller 120 may update the workload database 122 with a respective new tag—"Archived workload" for the workload 110B and the timestamp (e.g., 2021-02-11 09:00:30) at which the workload 110B is archived.

In certain examples, as will be described in greater detail in FIG. 5, if an attempt to access an archived workload (e.g., the workload 110B) is made, the workload controller 120 may reactivate such archived workload for which the attempt to access is made. The archived workloads that are not attempted to access may continue to remain archived. Accordingly, at block 418, the workload controller 120 may perform a check to determine if the given workload (e.g., the workloads 110B, 100C) remained in the archived state for the fourth duration after it is archived. To perform such a check at block 418, the workload controller 120 may compare a current timestamp with the timestamp (e.g., the archival timestamp) at which the given workload was archived. For a given archived workload, if a difference between the current timestamp and the archival timestamp is greater than the fourth duration, the workload controller 120 may determine that the given workload remained in the archived state for the fourth duration after it is archived.

At block 418, if it is determined that the given workload has not remained in the archived state for the fourth duration after the given workload is deactivated, the workload controller 120 may determine that the given workload has been reactivated and the workload controller 120 may continue to execute operation at block 406. However, at block 418, if it is determined that the given workload has remained in the archived state for the fourth duration after the given workload is archived, the workload controller 120 may, at block 420, remove the given workload and update the workload database 122 by deleting entries corresponding to the removed workload. For example, if the workload controller 120 determines that the workload 110B remains in the archived states for the second duration (e.g., 30 days), the workload controller 120 may remove the workload 110B. Table-6 presented below represents an updated content of a workload database 122 after execution of the operation at block 420, in one example.

TABLE 6

Updated content of the workload database 122

| Workload | Tag | Deactivation Timestamp |
|---|---|---|
| 110A | Active workload | — |
| 110C | Deactivated workload | 2021-02-14 11:00:15 |

In some examples, to perform the deactivation, the archival, or the cleaning of a workload at blocks 412, 416, and 420, respectively, the workload controller 120 may send one or more commands to the workload deployment manager 210. For example, in response to receiving a workload deactivation command from the workload controller 120 at block 412 to deactivate the workloads 110B, 110C, the workload deployment manager 210 may shut down the workloads 110B, 110C. Further, in response to receiving a workload archival command from the workload controller 120 at block 416 to archive the workloads 110B, the workload deployment manager 210 may archive the workload 110B. Moreover, in response to receiving a workload removal command from the workload controller 120 at block 420 to remove the workload 110B, the workload deployment manager 210 may delete the workload 110B.

Referring now to FIG. 5, a method 500 for reactivating a purged workload is presented, in accordance with an example. The method 500 may include blocks 502, 504, and 506 (hereinafter collectively referred to as blocks 502-506) that are performed by the workload controller 120. In certain examples, operations at blocks 502-506 may be performed by the processing resource 302 by executing one or more of the instructions 308 stored in the machine-readable medium 304. At block 502, the workload controller 120 may receive an alert indicative of an attempt to access a purged workload. As described hereinabove in FIGS. 1 and 2, the attempt to access the purged workload may be detected based on port mirrored data traffic that is received by the network traffic monitor 116. In some examples, the alert may include identification information of the purged workload being attempted to access. For example, if the log analyzer 118 identifies that an attempt to access the workload 110C is made based on the data traffic log, the log analyzer 118 may generate an alert including an IP address (or any other identifying) information of the workload 110C.

In some examples, at block 504, the workload controller 120 may identify the purged workload being attempted to access based on the alert. In some examples, the workload controller 120 may parse or decode the alert to search for the identity information contained in the alert. As previously noted, the alert may include the identity information of the purged workload that is attempted to access. For example, if the alert includes an IP address of the workload 110C, the workload controller 120 may determine that the attempt to access the workload 110C has been made. Moreover, in some examples, at block 506, the workload controller 120 may activate the purged workload (e.g., the workload 110C) by sending a workload activation command to the workload 110C or the network resource (e.g., a server 114C) hosting the workload 110C. In some examples, activating the purged workload by the workload controller 120 may include, sending, by the workload controller 120, a workload activation command to the workload deployment manager 210 to power-on the purged workload. For example, the workload controller 120 may send the workload activation command to the workload deployment manager 210 to activate the workload 110C. In response to receipt of the workload activation command, the workload deployment manager 210 may power-on the workload 110C. As will be understood, the data traffic that was first directed to the purged workload (e.g., the workload 110C), based on which the log analyzer 118 generated the alert for the workload controller 120, might be dropped. However, since the purged workload (e.g., the workload 110C) has been reactivated, any subsequent data traffic directed to such reactivated workload may successfully reach the reactivated workload without being dropped. Moreover, in some examples, once the purged workload is reactivated, the workload controller 120 may update the workload database 122. In one example, the reactivated workload 110C may be tagged as an active workload in the workload database 122.

As will be appreciated, in some examples, the workload management system 104, 204 may reactivate a purged workload based on detection of attempted access to the purged workload with minimal downtime. This is achieved by monitoring the data traffic logs captured using port mirroring networking devices in the path of the workloads 110A-110C. This may ensure that there is a fine balance between operational cost savings and optimum availability of the workloads for a customer. Also, in some examples, the workload controller 120 identifies underutilized workloads based on several performance parameters including, but not limited to, compute utilization, memory utilization, disk IO, network IO, and performs a purging of the identified underutilized workloads in a phased manner based on the defined purge policy. Such a phased purging of the underutilized workloads may provide ample opportunities for an administrator to retrieve the underutilized workload if needed at a later point in time, along with savings in operational costs.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method comprising:
   accessing a purge policy from a policy database, the purge policy comprising a threshold underutilized percentage corresponding to a performance parameter, a first duration to tag a given workload of workloads deployed in a workload environment as underutilized, a second duration to deactivate the given workload, a third duration to archive the given workload, and a fourth duration to remove the given workload;
   making a first determination that a particular workload of the workloads deployed in the workload environment has an average workload utilization metric below the threshold underutilized percentage for the first duration, wherein the average workload utilization metric comprises the performance parameter;
   tagging, based on the first determination, the particular workload as an underutilized workload;
   making a second determination that the underutilized workload has remained underutilized for the second duration after being tagged as the underutilized workload;
   deactivating, based on the second determination, the underutilized workload to obtain a deactivated workload;
   making a third determination that the deactivated workload has remained deactivated for the third duration;
   archiving, based on the third determination, the deactivated workload to obtain an archived workload;
   receiving, by a workload controller, an alert indicative of an attempt to access the archived workload, wherein:
      the attempt to access the archived workload is detected based on port mirrored data traffic received from a network switch, wherein the port mirrored data traffic comprises any data traffic directed to the workloads deployed in the workload environment; and
   activating, by the workload controller, the archived workload based on the alert.

2. The method of claim 1, further comprising identifying, by the workload controller, the archived workload being attempted to access based on the alert, wherein the alert is received by the workload controller from a log analyzer.

3. The method of claim 1, wherein activating the archived workload comprises sending, by the workload controller, a workload activation command to a workload deployment manager to power-on the archived workload.

4. The method of claim 1, wherein the workloads communicate with the network switch via respective workload communication ports on the network switch, and wherein the port mirrored data traffic comprises any data traffic directed to the respective workload communication ports and which is forwarded to a mirror port on the network switch.

5. The method of claim 1, wherein the performance parameter comprises at least one of compute utilization, memory utilization, disk input-output, and network input-output.

6. The method of claim 1, further comprising:
determining the average workload utilization metric, at least in part, by calculating, for the performance parameter, a peak factor as a deviation of the performance parameter from the threshold underutilization percentage.

7. The method of claim 1, further comprising:
removing, by the workload controller, the archived workload if the archived workload remains in an archived state for the fourth duration after the archived workload has been archived.

8. A non-transitory machine-readable medium storing instructions executable by a processing resource, the instructions, when executed by the processing resource, causing the processing resource to:
access a purge policy from a policy database, the purge policy comprising a threshold underutilized percentage corresponding to a performance parameter, a first duration to tag a given workload of workloads deployed in a workload environment as underutilized, a second duration to deactivate the given workload, a third duration to archive the given workload, and a fourth duration to remove the given workload;
make a first determination that a particular workload of the workloads deployed in the workload environment has an average workload utilization metric below the threshold underutilized percentage for the first duration, wherein the average workload utilization metric comprises the performance parameter;
tag, based on the first determination, the particular workload as an underutilized workload;
make a second determination that the underutilized workload has remained underutilized for the second duration after being tagged as the underutilized workload;
deactivate, based on the second determination, the underutilized workload to obtain a deactivated workload;
make a third determination that the deactivated workload has remained deactivated for the third duration;
archive, based on the third determination, the deactivated workload to obtain an archived workload;
receive, at a workload controller, an alert indicative of an attempt to access the archived workload, wherein:
the attempt to access the archived workload is detected based on port mirrored data traffic received from a network switch, wherein the port mirrored data traffic comprises any data traffic directed to the workloads deployed in the workload environment; and
activate the archived workload based on the alert.

9. The non-transitory machine-readable medium of claim 8, wherein instructions to activate the archived workload comprise instructions to send workload activation command to a workload deployment manager to power-on the archived workload.

10. The non-transitory machine-readable medium of claim 8, wherein the performance parameter comprises at least one of compute utilization, memory utilization, disk input-output, and network input-output.

11. The non-transitory machine-readable medium of claim 8, wherein the instructions, when executed by the processing resource, further cause the processing resource to:
determine the average workload utilization metric, at least in part, by calculating, for the performance parameter, a peak factor as a deviation of the performance parameter from the threshold underutilization percentage.

12. The non-transitory machine-readable medium of claim 8, wherein the instructions, when executed by the processing resource, further cause the processing resource to:
remove, by the workload controller, the archived workload if the archived workload remains in an archived state for the fourth duration after the archived workload has been archived.

13. A workload controller, comprising:
a machine-readable medium storing instructions; and
a processing resource coupled to the machine-readable medium, wherein the processing resource is configured to:
access a purge policy from a policy database, the purge policy comprising a threshold underutilized percentage corresponding to a performance parameter, a first duration to tag a given workload of workloads deployed in a workload environment as underutilized, a second duration to deactivate the given workload, a third duration to archive the given workload, and a fourth duration to remove the given workload;
make a first determination that a particular workload of the workloads deployed in the workload environment has an average workload utilization metric below the threshold underutilized percentage for the first duration, wherein the average workload utilization metric comprises the performance parameter;
tag, based on the first determination, the particular workload as an underutilized workload;
make a second determination that the underutilized workload has remained underutilized for the second duration after being tagged as the underutilized workload;
deactivate, based on the second determination, the underutilized workload to obtain a deactivated workload;
make a third determination that the deactivated workload has remained deactivated for the third duration;
archive, based on the third determination, the deactivated workload to obtain an archived workload;
receive an alert indicative of an attempt to access the archived workload, wherein:
the attempt to access the archived workload is detected based on port mirrored data traffic received from a network switch, wherein the port mirrored data traffic comprises any data traffic directed to the workloads deployed in the workload environment; and
activate the archived workload based on the alert.

14. The workload controller of claim 13, wherein the processing resource is configured to execute one or more of the instructions to send a workload activation command to a workload deployment manager to power-on the archived workload.

15. The workload controller of claim 13, wherein the processing resource is configured to execute one or more of the instructions to remove the archived workload if the archived workload remains in an archived state for the fourth duration after the archived workload has been archived.

16. The workload controller of claim 13, wherein the performance parameter comprises at least one of compute utilization, memory utilization, disk input-output, and network input-output.

17. The workload controller of claim 13, wherein the processing resource is further configured to:
   determine the average workload utilization metric, at least in part, by calculating, for the performance parameter, a peak factor as a deviation of the performance parameter from the threshold underutilization percentage.

* * * * *